(12) United States Patent
Kuo

(10) Patent No.: US 10,757,543 B1
(45) Date of Patent: Aug. 25, 2020

(54) METHOD OF INITIATING OPENING OF WEBPAGE WITH IDENTITY VERIFICATION AND THROUGH MESSAGING SERVICE

(71) Applicant: Teamplus Technology Inc., New Taipei (TW)

(72) Inventor: Cheng-Hsiang Kuo, New Taipei (TW)

(73) Assignee: TEAMPLUS TECHNOLOGY INC., New Taipei (TW)

( * ) Notice: Subject to any disclaimer, the term of this patent is extended or adjusted under 35 U.S.C. 154(b) by 0 days.

(21) Appl. No.: 16/735,373

(22) Filed: Jan. 6, 2020

(30) Foreign Application Priority Data

Aug. 15, 2019 (TW) .............................. 108129118 A

(51) Int. Cl.
| | |
|---|---|
| *H04W 4/14* | (2009.01) |
| *H04W 12/06* | (2009.01) |
| *G06F 16/955* | (2019.01) |
| *H04L 12/58* | (2006.01) |
| *H04L 29/08* | (2006.01) |
| *H04L 29/06* | (2006.01) |

(52) U.S. Cl.
CPC ............ *H04W 4/14* (2013.01); *G06F 16/955* (2019.01); *H04L 51/38* (2013.01); *H04L 63/0823* (2013.01); *H04L 67/02* (2013.01); *H04W 12/0609* (2019.01)

(58) Field of Classification Search
CPC ... H04W 4/14; H04W 12/06; H04W 12/0609; H04W 12/08; H04W 12/10; H04W 12/0808; H04W 12/0608; H04W 12/0806; H04W 12/0804; H04W 12/1008; H04W 4/50; H04W 12/60; H04W 8/18; H04W 12/00; H04W 8/20; H04W 80/00; H04W 80/02; H04W 80/04; H04W 88/00; H04W 88/02; H04L 29/06; H04L 29/08; H04L 12/58; H04L 67/02; H04L 63/0823; H04L 51/38; H04L 41/0253; H04L 9/00; H04L 9/32; G06F 16/955; G06F 16/958; G06F 16/957; G06F 2221/2117; G06F 2221/2119; G06F 16/986

See application file for complete search history.

(56) References Cited

U.S. PATENT DOCUMENTS

| | | | |
|---|---|---|---|
| 8,182,369 B2* | 10/2012 | Chavez et al. | .................... 726/3 |
| 9,386,164 B2* | 7/2016 | Jain | ........................ H04M 15/08 |
| 10,049,360 B2* | 8/2018 | Hammad | ............ G06Q 26/4014 |
| 10,333,945 B2* | 6/2019 | Vinukonda et al. | ......................... H04L 63/108 |

(Continued)

*Primary Examiner* — Meless N Zewdu
(74) *Attorney, Agent, or Firm* — Hamre, Schumann, Mueller & Larson, P.C.

(57) ABSTRACT

A method implemented by a server includes: sending a link short message (LSM) to a terminal; generating a communication token (C token) based on a link request of the terminal, and determining whether the server has stored another identical C token; when negative, storing the C token, and sending web data and the C token to the terminal; when affirmative, further determining whether a web cookie in the link request contains a browsing token identical to the C token; when affirmative, sending the web data to the terminal; and when negative, sending a verification short message (VSM) to the terminal, and sending the web data to the terminal upon receiving a verification request within a predetermined duration since sending the VSM.

10 Claims, 8 Drawing Sheets

(56) References Cited

U.S. PATENT DOCUMENTS

| | | | |
|---|---|---|---|
| 10,496,800 B2* | 12/2019 | Morris | G06F 21/128 |
| 2004/0148392 A1* | 7/2004 | Cotte | 709/225 |
| 2005/0182824 A1* | 8/2005 | Cotte | 709/217 |
| 2007/0011248 A1* | 1/2007 | Kalervo et al. | 709/206 |
| 2008/0216023 A1* | 4/2008 | Berglund et al. | 715/855 |
| 2009/0235329 A1* | 9/2009 | Chavez et al. | 726/3 |
| 2011/0161178 A1* | 6/2011 | Rosenstein et al. | 705/14.69 |
| 2012/0014292 A1* | 1/2012 | Okabe et al. | 370/259 |
| 2013/0090920 A1* | 4/2013 | Gorman et al. | G06F 17/28 |
| 2013/0260739 A1* | 10/2013 | Saino | H04W 8/22 |
| 2014/0040729 A1* | 2/2014 | Marlow et al. | 715/240 |
| 2015/0120691 A1* | 4/2015 | Blemaster | G06F 17/0864 |
| 2017/0017939 A1* | 1/2017 | Killoran, Jr. et al. | G06Q 20/102 |
| 2017/0019435 A1* | 1/2017 | Toutain et al. | H04L 65/1069 |
| 2017/0185589 A1* | 6/2017 | Neff et al. | G06F 17/2854 |
| 2017/0323360 A1* | 11/2017 | Gurunathan | G06Q 30/0611 |
| 2018/0159840 A1* | 6/2018 | Hau et al. | H04L 63/08 |

\* cited by examiner

US 10,757,543 B1

METHOD OF INITIATING OPENING OF WEBPAGE WITH IDENTITY VERIFICATION AND THROUGH MESSAGING SERVICE

CROSS-REFERENCE TO RELATED APPLICATION

This application claims priority of Taiwanese Invention Patent Application No. 108129118, filed on Aug. 15, 2019.

FIELD

The disclosure relates to a method of initiating opening of a webpage, and more particularly to a method of initiating opening of a webpage with identity verification and through messaging service.

BACKGROUND

Short message service (SMS) marketing is widely utilized in businesses to promote products and services. A short message sent to potential consumers may contain web data that is usable by a web browser to open a webpage introducing details of products and/or services. Conventionally, the short message can be forwarded arbitrarily so a sender may not know who receives the forwarded short message and is able to obtain the web data. As a result, some promotional offers (such as discount information) exclusive to specific potential consumers may circulate among non-targeted consumers, bringing inconvenience to consumers and/or merchants. Moreover, the webpage to be opened based on the web data may contain personal privacy information, and rights of consumers and/or merchants may be infringed if the short message is forwarded arbitrarily.

SUMMARY

Therefore, an object of the disclosure is to provide a method of initiating opening of a webpage with identity verification and through messaging service that can alleviate at least one of the drawbacks of the prior art.

According to the disclosure, the method is adapted to be implemented by a communication server that is communicable with a receiving terminal. The method includes:

transmitting a link short message that contains link information to the receiving terminal based on a phone number of the receiving terminal, and storing the link information and the phone number of the receiving terminal that corresponds to the link information, transmission of the link short message enabling the receiving terminal to transmit a link request to the communication server by using a web browser based on the link information, where the link request contains the link information, and the link request further contains the web cookie when the web browser has stored a web cookie that is related to the link information and that contains a browsing token;

generating a communication token that corresponds to the receiving terminal based on the link request, and making a first determination as to whether the communication server has stored another communication token that is identical to the communication token thus generated;

when a result of the first determination is negative, storing the communication token thus generated, and transmitting web data and the communication token thus generated to the receiving terminal, where the web data is usable by the web browser to open a webpage and the receiving terminal stores the communication token received from the communication server as the browsing token;

when the result of the first determination is affirmative, making a second determination as to whether the browsing token contained in the web cookie that is contained in the link request is identical to the communication token thus generated;

when a result of the second determination is affirmative, transmitting the web data to the receiving terminal; and when the result of the second determination thus made is negative, transmitting a verification short message that contains a verification link to the receiving terminal based on the phone number of the receiving terminal, and transmitting the web data to the receiving terminal in response to receipt of a verification request within a lapse of a predetermined time length after the verification short message is transmitted, where the verification request is transmitted by the receiving terminal via the verification link.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
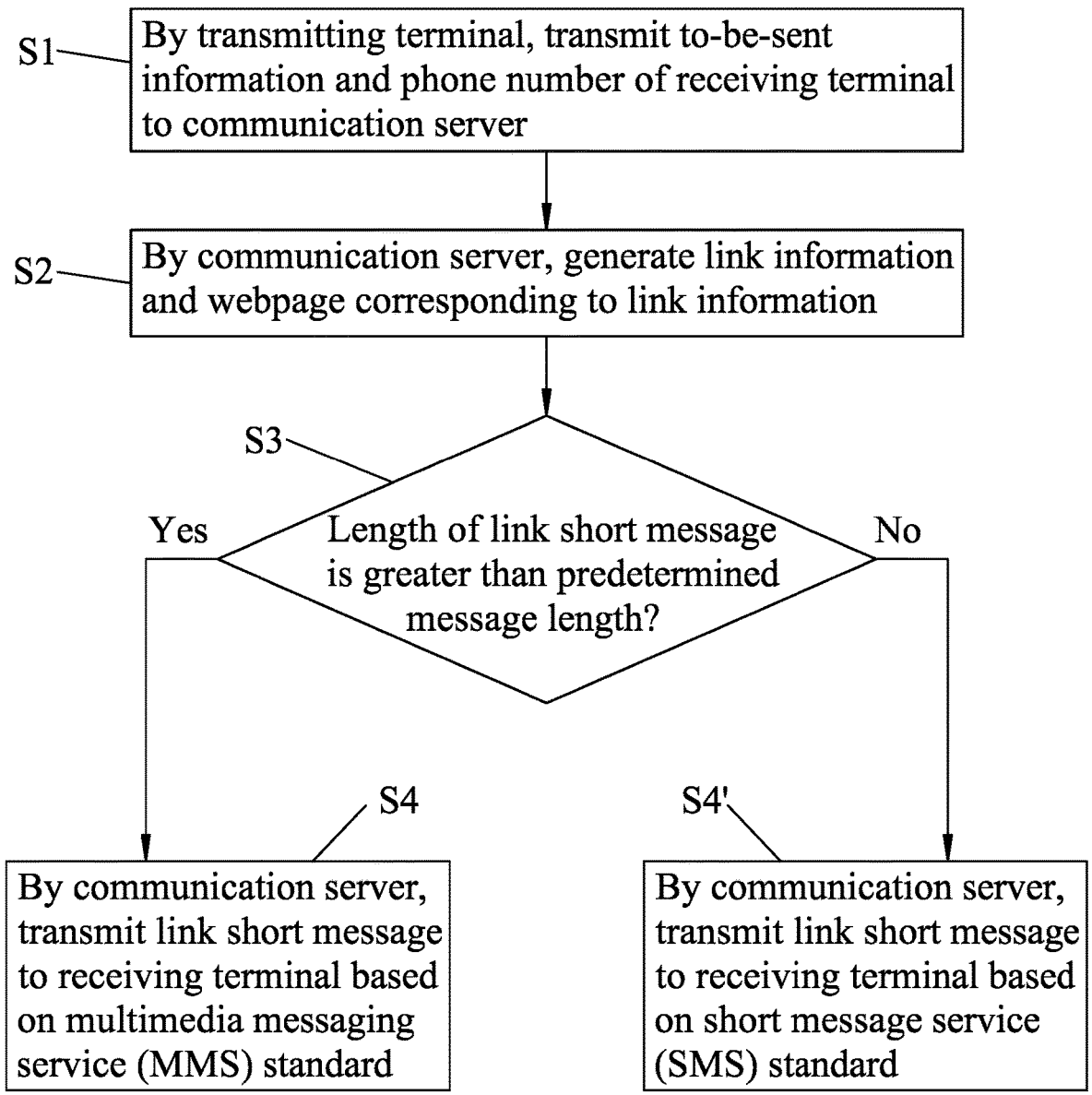
FIGS. 1, 2A and 2B cooperatively constitute a flow chart for illustrating an embodiment of a method of initiating opening of a webpage with identity verification and through messaging service according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2A:
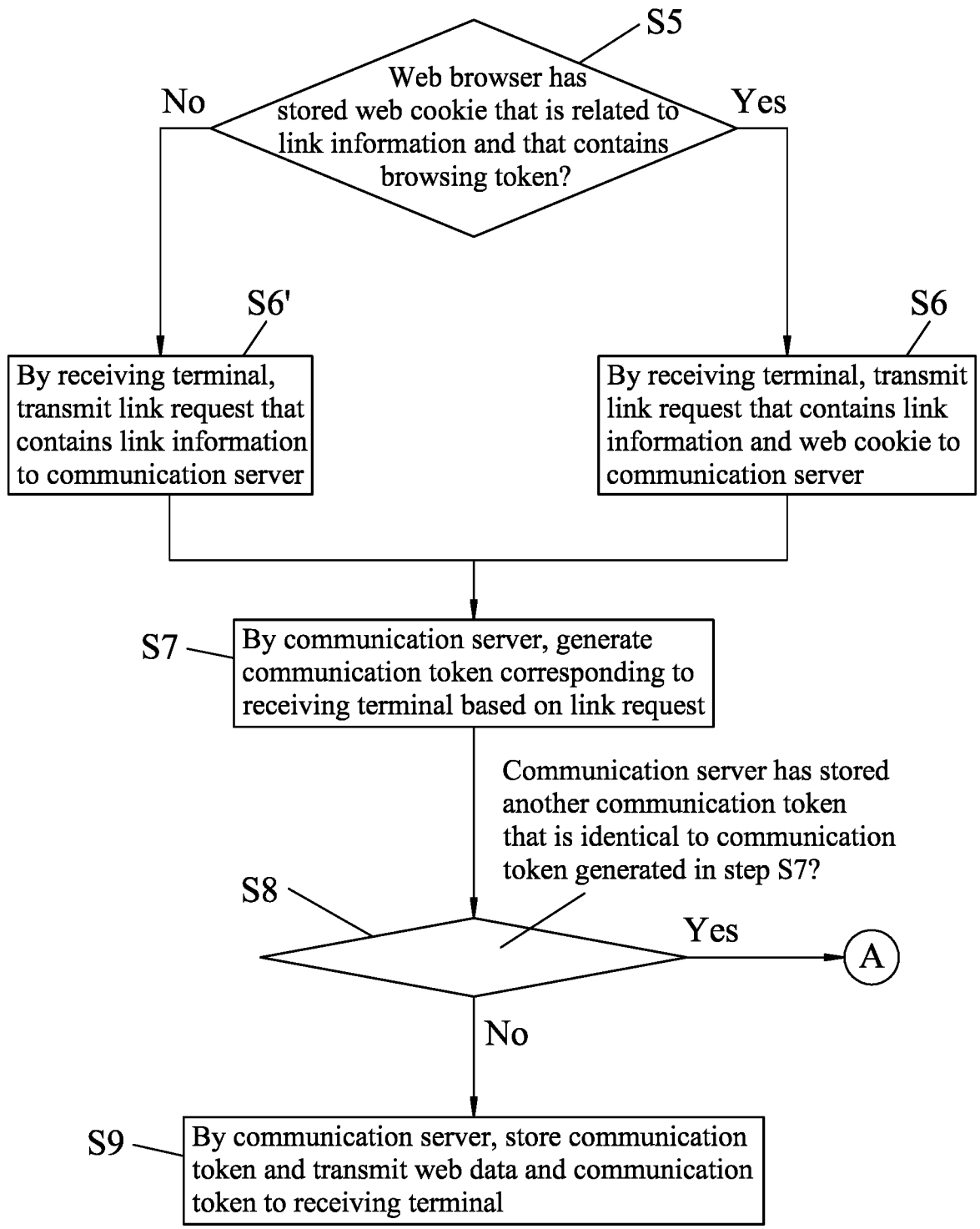
Figure 2B:
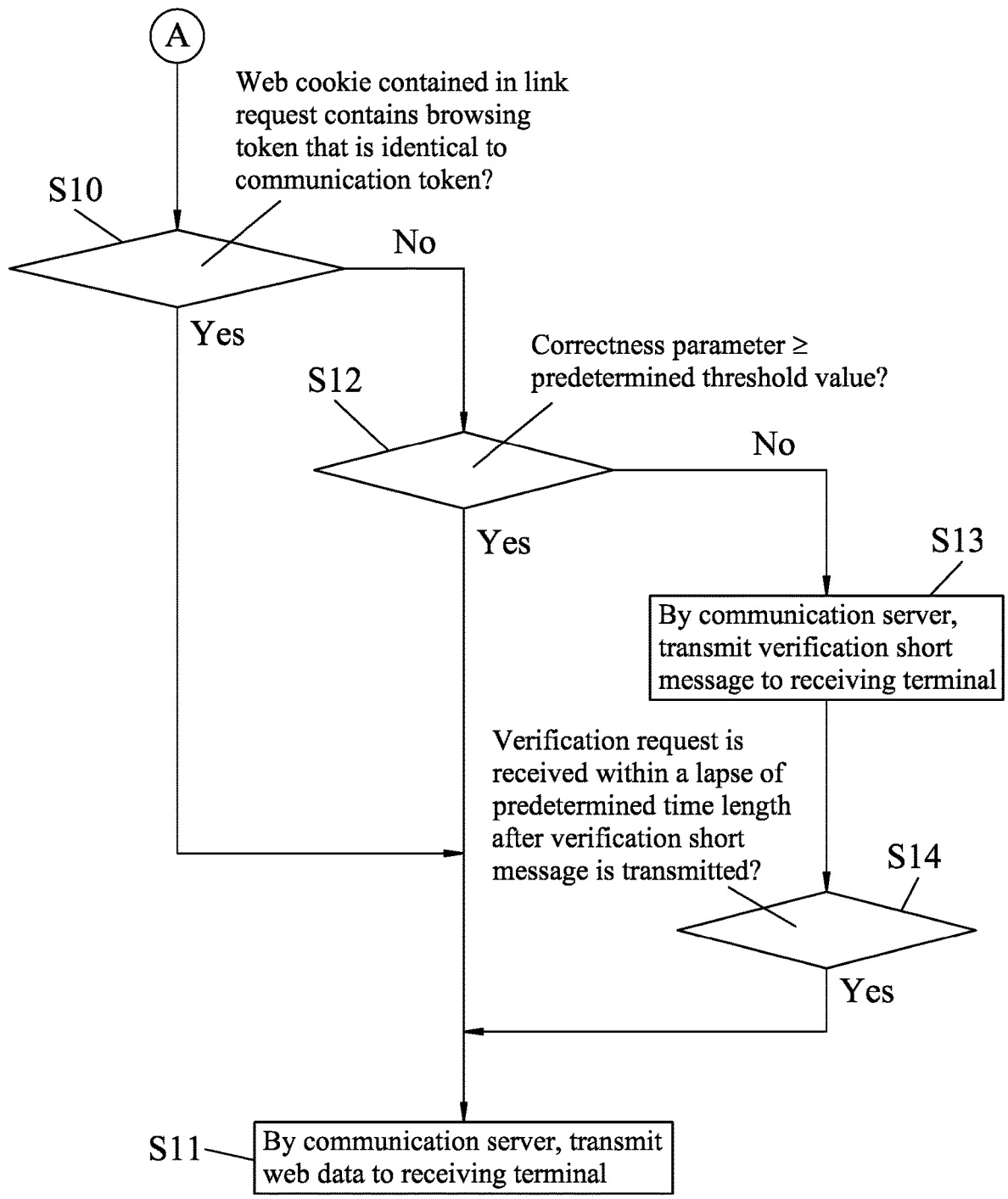
Figure 3:
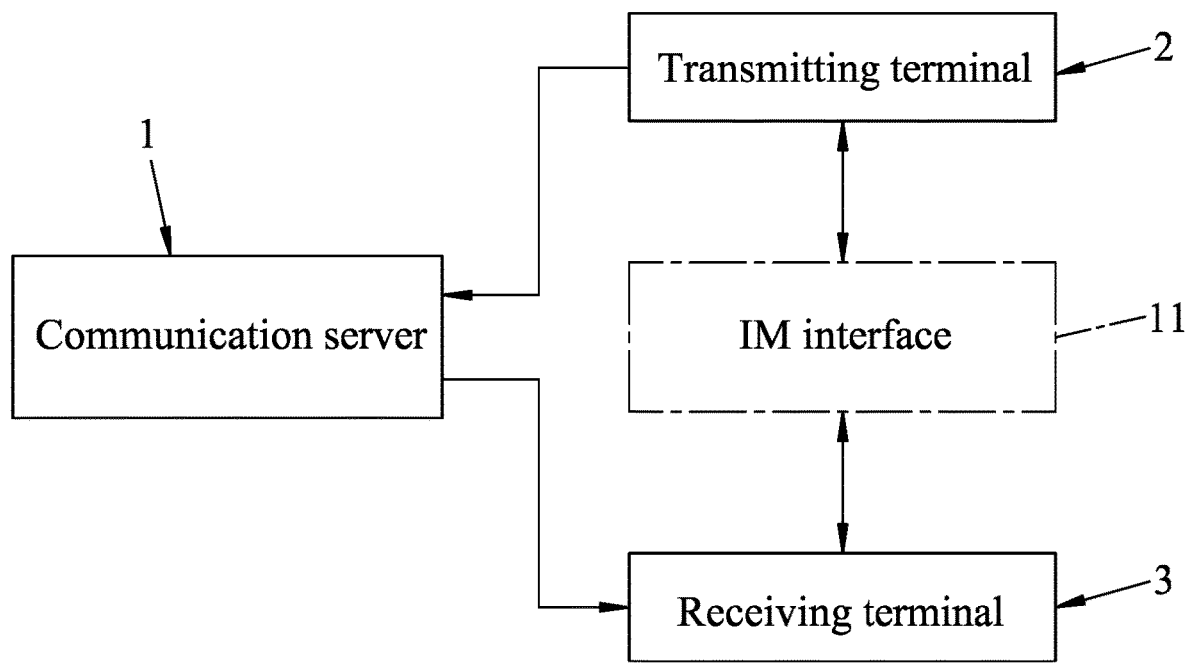
FIG. 3 is a block diagram illustrating an embodiment of a system that utilizes the method according to the disclosure.

FIGS. 1, 2A and 2B illustrate an embodiment of a method of initiating opening of a webpage with identity verification and through messaging service according to the disclosure. As shown in FIG. 3, the method is adapted to be utilized in a system which includes a communication server 1, a transmitting terminal 2 and a receiving terminal 3. Specifically, the method is adapted to be implemented by the communication server 1 that is communicable with the transmitting terminal 2 and the receiving terminal 3.

The communication server 1 may be implemented to be a computing server, a network server, a web server and/or a data server, but implementation of the server 1 is not limited to the disclosure herein and may vary in other embodiments. Each of the transmitting terminal 2 and the receiving terminal 3 may be implemented to be a desktop computer, a laptop computer, a notebook computer, a tablet computer, a smartphone, or any electronic device that is capable of performing communication functions and data processing functions (e.g., browsing the Internet, or sending and receiving short messages), but implementation thereof is not limited to what are disclosed herein and may vary in other embodiments.

The receiving terminal 3 is communicable with the transmitting terminal 2 via the communication server 1. Specifically speaking, the transmitting terminal 2 prompts the communication server 1 to message the receiving terminal 3 so as to enable the receiving terminal 3 to initiate opening of a webpage that is associated with an interface of instant messaging (IM) 11 (hereinafter also referred to as IM interface 11) which enables real-time communication to be conducted between the transmitting terminal 2 and the receiving terminal 3. Additionally, identity verification is involved in the opening of the webpage, enhancing information security and management. For example, privacy of consumers may be protected, and contents of marketing messages may be customized.

Referring back to FIGS. 1, 2A and 2B, steps of the method are described below.

In step S1, a merchant utilizes the transmitting terminal 2 to transmit to-be-sent information and a phone number of the receiving terminal 3 to the communication server 1. In this embodiment, the to-be-sent information contains a message subject, message main text which may be a marketing notice, and a welcome announcement which may include greetings, introduction to product(s) and/or service (s) provided by the merchant, or introduction related to the marketing notice. The message subject may include a name of the merchant, or name(s) of the product(s) and/or service (s) provided by the merchant. However, contents of the message subject, the message main text and the welcome announcement are not limited to the disclosure herein and may vary depending on demands of the merchant.

In step S2, based on the to-be-sent information, the communication server 1 generates link information that corresponds to the receiving terminal 3, and a webpage that corresponds to the link information. In this embodiment, the webpage is the IM interface 11. In this embodiment, the link information is a uniform resource locator (URL), but is not limited thereto. For example, the link information may be an R-link. The link information contains webpage address information and code information. The webpage address information corresponds to the product(s) and/or the service (s) provided by the merchant, and indicates an address of the webpage generated by the communication server 1. The code information is a code that is randomly generated such that the link information uniquely corresponds to the receiving terminal 3. The code information may be encoded by five to seven digits in a base-36 numeral system so as to result in $(36^5+36^6+36^7)$ number of possible unique representations in total, which is sufficient for mass marketing. Moreover, the link information may be implemented to be temporary, i.e., only valid for a limited time (e.g., 10 minutes), enhancing flexibility in management of the link information by the communication server 1 or by the merchant.

Figure 6:
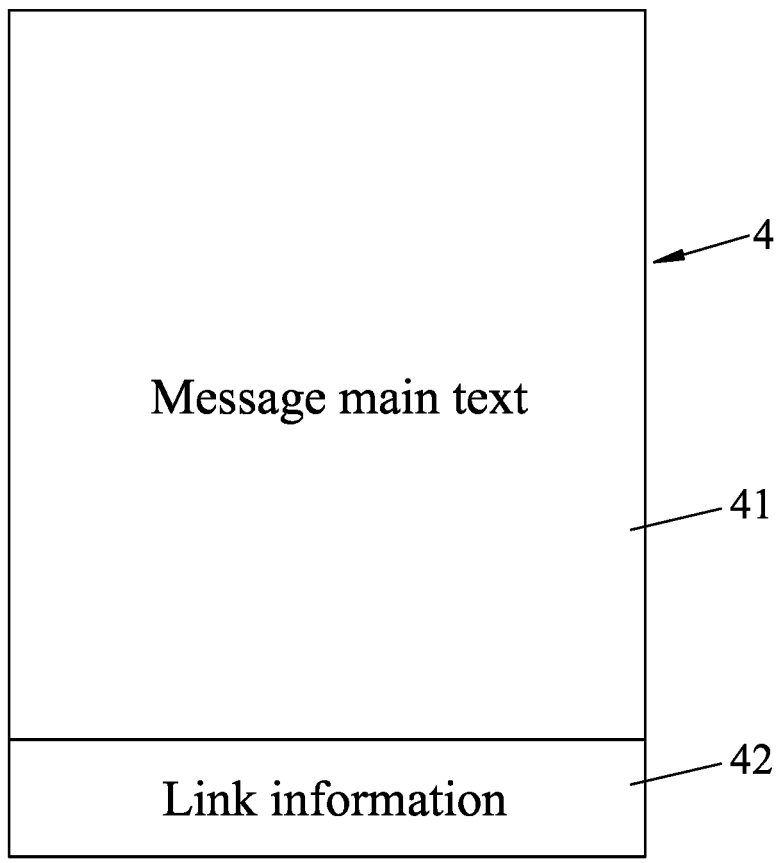
FIG. 6 is a schematic diagram illustrating an embodiment of presentation of a link short message.

In steps S3 and S4, based on the phone number of the receiving terminal 3, the communication server 1 transmits to the receiving terminal 3 a link short message 4 (see FIG. 6) that contains the link information, and the communication server 1 stores the link information and the phone number of the receiving terminal 3. The link short message 4 may further include the message main text of the to-be-sent information received by the communication server 1 from the transmitting terminal 2. Presentation of the link short message 4 on the receiving terminal 3 may be exemplified as shown in FIG. 6. The message main text of the to-be-sent information is displayed in an upper block 41 of the presentation of the link short message 4, and the link information is displayed in a lower block 42 of the presentation of the link short message 4.

In one embodiment, after transmitting the link short message 4, the communication server 1 further stores the message main text contained in the link short message 4, and a serial number of message sending. The serial number of message sending is a non-repeating serial number corresponding uniquely to transmission of the link short message 4, and may be implemented by globally unique identifier (GUID) so as to allow the link short message 4 to be traced afterward. The transmission of the link short message 4 enables the receiving terminal 3 to transmit a link request to the communication server 1 by using a web browser based on the link information.

Specifically speaking, in step S3, the communication server 1 determines whether a length of the link short message 4 is greater than a predetermined message length. In this embodiment, the length of the link short message 4 is a total number of word(s) contained in the link short message 4 (i.e., words or characters (e.g., Chinese characters) of the link information and the message main text), and the predetermined message length is 70 words. When it is determined that the length of the link short message 4 is greater than the predetermined message length, a flow of procedure of the method proceeds to step S4. Otherwise, when it is determined that the length of the link short message 4 is not greater than the predetermined message length, the flow proceeds to step S4'.

In step S4, the communication server 1 transmits the link short message 4 to the receiving terminal 3 based on multimedia messaging service (MMS) standard.

In step S4', the communication server 1 transmits the link short message 4 to the receiving terminal 3 based on short message service (SMS) standard.

After receiving the link short message 4, a consumer may click the link information contained in the link short message 4 displayed on the receiving terminal 3 so as to make the receiving terminal 3 transmit the link request to the communication server 1.

Specifically speaking, in step S5, after the link information is clicked, the receiving terminal 3 executes the web browser to determine whether the web browser has stored a web cookie that is related to the link information and that contains a browsing token. When it is determined that the web browser has stored the web cookie, the flow proceeds to step S6. On the other hand, when it is determined that the web browser has not stored the web cookie, the flow proceeds to step S6'.

In step S6, the receiving terminal 3 transmits the link request that contains the link information and the web cookie to the communication server 1. Then, the flow proceeds to step S7.

In step S6', the receiving terminal 3 transmits the link request that merely contains the link information to the communication server 1. Then, the flow proceeds to step S7.

In step S7, the communication server 1 generates a communication token that uniquely corresponds to the receiving terminal 3 based on the link request, and then the flow proceeds to step S8. It should be noted that the communication server 1 is capable of recognizing the receiving terminal 3 based on the communication token.

In step S8, the communication server 1 makes a first determination as to whether the communication server has stored another communication token that is identical to the communication token thus generated. When a result of the first determination is negative, the flow proceeds to step S9. Oppositely, when the result of the first determination is affirmative, the flow proceeds to step S10.

In step S9, the communication server 1 stores the communication token thus generated, and transmits web data and the communication token thus generated to the receiving terminal 3. The web data is associated with the IM interface 11 and is usable by the web browser installed on the receiving terminal 3 to open the webpage. The receiving terminal 3 stores the communication token received from the communication server 1 as the browsing token.

In step S10, the communication server 1 makes a second determination as to whether the browsing token contained in the web cookie that is contained in the link request is identical to the communication token thus generated. When a result of the second determination is affirmative, the communication server 1 increases a value of a correctness parameter stored in the communication server 1, or sets the value of the correctness parameter to be a preset correctness value that is greater than a predetermined threshold value, and then the flow proceeds to step S11. Otherwise, when the result of the second determination thus made is negative, the communication server 1 decreases the value of the correctness parameter (e.g., the value of the correctness parameter is multiplied by a constant multiplier larger than zero and smaller than one), and the flow proceeds to step S12.

It should be noted that adjustment of the value of the correctness parameter is not limited to the disclosure herein and may vary in other embodiments. In one embodiment, the value of the correctness parameter is adjusted according to a predetermined mathematical formula based on the result of the second determination.

In step S11, the communication server 1 transmits the web data to the receiving terminal 3.

In step S12, the communication server 1 makes a third determination as to whether the value of the correctness parameter is not smaller than the predetermined threshold value. When a result of the third determination thus made is affirmative, the flow proceeds to step S11. On the contrary, when the result of the third determination thus made is negative, the flow proceeds to step S13.

In step S13, the communication server 1 transmits a verification short message to the receiving terminal 3 based on the phone number of the receiving terminal 3. Thereafter, the flow proceeds to step S14. In one embodiment, the making of the third determination (i.e., step S12) may be omitted for simplifying procedures of the method. That is to say, when the result of the second determination made in step 10 is negative, the flow proceeds to step 13 where the communication server 1 directly transmits the verification short message to the receiving terminal 3.

The verification short message contains a verification link and main text related to identity verification. In this embodiment, the verification link is also an URL, but may be an R-link in other embodiments. The verification link contains another webpage address information and another code information. The another webpage address information of the verification link may be the same as the webpage address information of the link information that is previously mentioned; that is, the another webpage address information corresponds to the product(s) and/or the service(s) provided by the merchant. Alternatively, the another webpage address information may correspond to a webpage indicating that identity verification is being processed, and the webpage is redirected to the IM interface 11 when the identification verification is successful. The another code information of the verification link is randomly generated, such that the verification link uniquely corresponds to the receiving terminal 3. In this embodiment, for the same receiving terminal 3, the another code information of the verification link is different from the code information of the link information.

Presentation of the verification short message is similar to that of the link short message 4 as shown in FIG. 6, i.e., the main text related to identity verification is displayed in an upper block of the presentation of the verification short message, and the verification link is displayed in a lower block of the presentation of the verification short message.

In step S14, the communication server 1 determines whether a verification request that is transmitted by the receiving terminal 3 via the verification link is received within a lapse of a predetermined time length after the verification short message is transmitted to the receiving terminal 3. When a result of the aforementioned determination is affirmative, the flow proceeds to step S11, and the communication server 1 transmits the web data to the receiving terminal 3 to realize webpage redirection to the IM interface 11.

For example, in a scenario where a value of the correctness parameter is initially equal to 0.5, the predetermined threshold value is equal to 0.5, and the preset correctness value is equal to one, the communication server 1 sets the value of the correctness parameter to the preset correctness value (i.e., one) when the result of the second determination is affirmative, and multiplies the value of the correctness parameter by 0.75 when the result of the second determination is negative.

The first time the communication terminal 1 receives the link request transmitted from the receiving terminal 3 of the consumer, the result of the first determination would be negative. Therefore, the communication server 1 would store the communication token generated in step S7, and transmit the web data and the communication token to the receiving terminal 3.

The second time the communication terminal 1 receives the link request, the result of the first determination would be affirmative. Consequently, the communication server 1 would then make the second determination. When the result of the second determination is affirmative, the communication server 1 would set the value of the correctness parameter to the preset correctness value (i.e., one) and transmit the web data to the receiving terminal 3.

The third time the communication terminal 1 receives the link request, the result of the first determination would be affirmative, so the communication server 1 would make the second determination. When the result of the second determination is negative, i.e., the browsing token contained in the web cookie that is contained in the link request is not identical to the communication token, the communication server 1 would multiply the value of the correctness parameter by 0.75, and then make the third determination. Since the value of the correctness parameter is equal to 1×0.75=0.75, which is greater than the predetermined threshold value (i.e., 0.5), the communication server 1 would still transmit the web data to the receiving terminal 3.

Although it is determined that the web cookie contained in the link request does not contain a browsing token that is identical to the communication token, the communication server 1 would still directly transmit the web data to the receiving terminal 3 unless the negative result of the second determination occurs repeatedly several times to make the correctness parameter be decreased to a value smaller than the predetermined threshold value. In this way, in a scenario where the result of the second determination is negative for absence of the web cookie because the web browser of the receiving terminal 3 has been reinstalled or because the receiving terminal 3 is a new smartphone replacing an old one, the communication server 1 would still transmit the web data to the receiving terminal 3 without transmitting the verification short message for requiring the receiving terminal 3 to respond with the verification request, as long as the value of the correctness parameter is greater than the predetermined threshold value. Since fault tolerance for the absence of the web cookie is taken into account, a balance between information safety and convenience of using the method according to the disclosure is struck.

Figure 7:
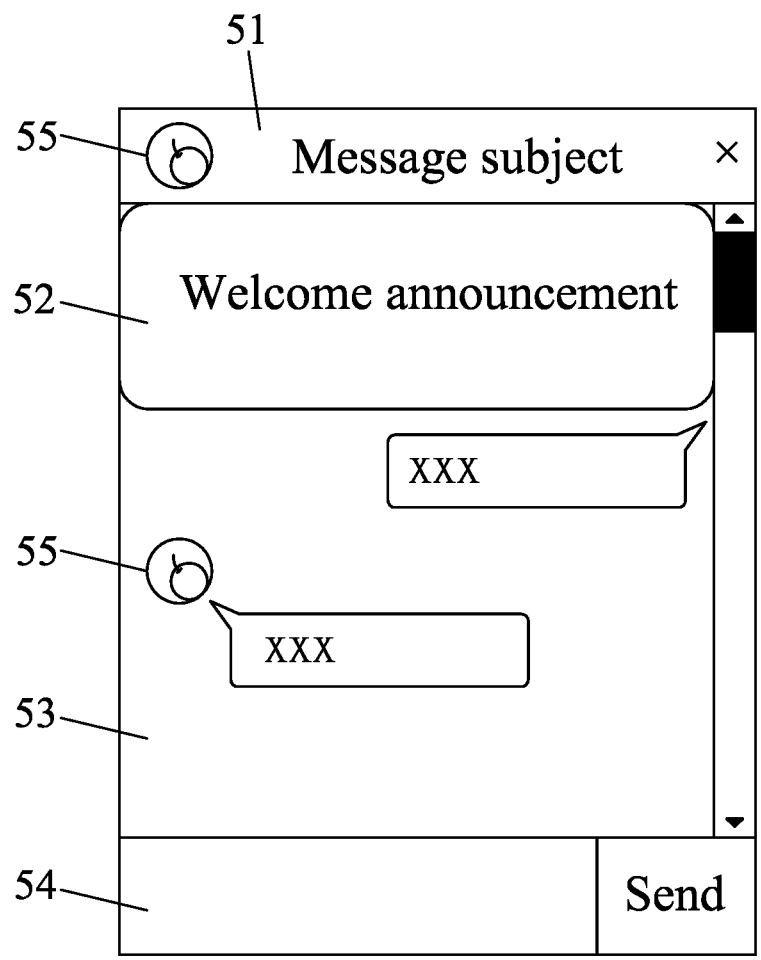
FIG. 7 is a schematic diagram illustrating an embodiment of an interface of instant messaging (IM).

Referring to FIG. 7, presentation of the IM interface 11 by the web browser of the receiving terminal 3 is illustrated. The IM interface 11 has a top portion 51, a middle portion 53 and a bottom portion 54. A profile picture 55 of the merchant and a subject of communication are displayed in the top portion 51 of the IM interface 11. Instant messages exchanged between the merchant and the consumer are displayed in the middle portion 53 of the IM interface 11, and each of the instant messages sent from the merchant may be attached with the profile picture 55 of the merchant for identifying the sender of the instant message (i.e., the merchant). In some embodiments, the welcome announcement contained in the to-be-sent information is displayed in a greeting block 52 next to a lower side of the top portion 51 of the IM interface 11. An instant message to be sent by the consumer is displayed and edited in the bottom portion 54 of the IM interface 11. It is worth to note that in this embodiment, the IM interface 11 is implemented by hypertext markup language (HTML).

Figure 4:
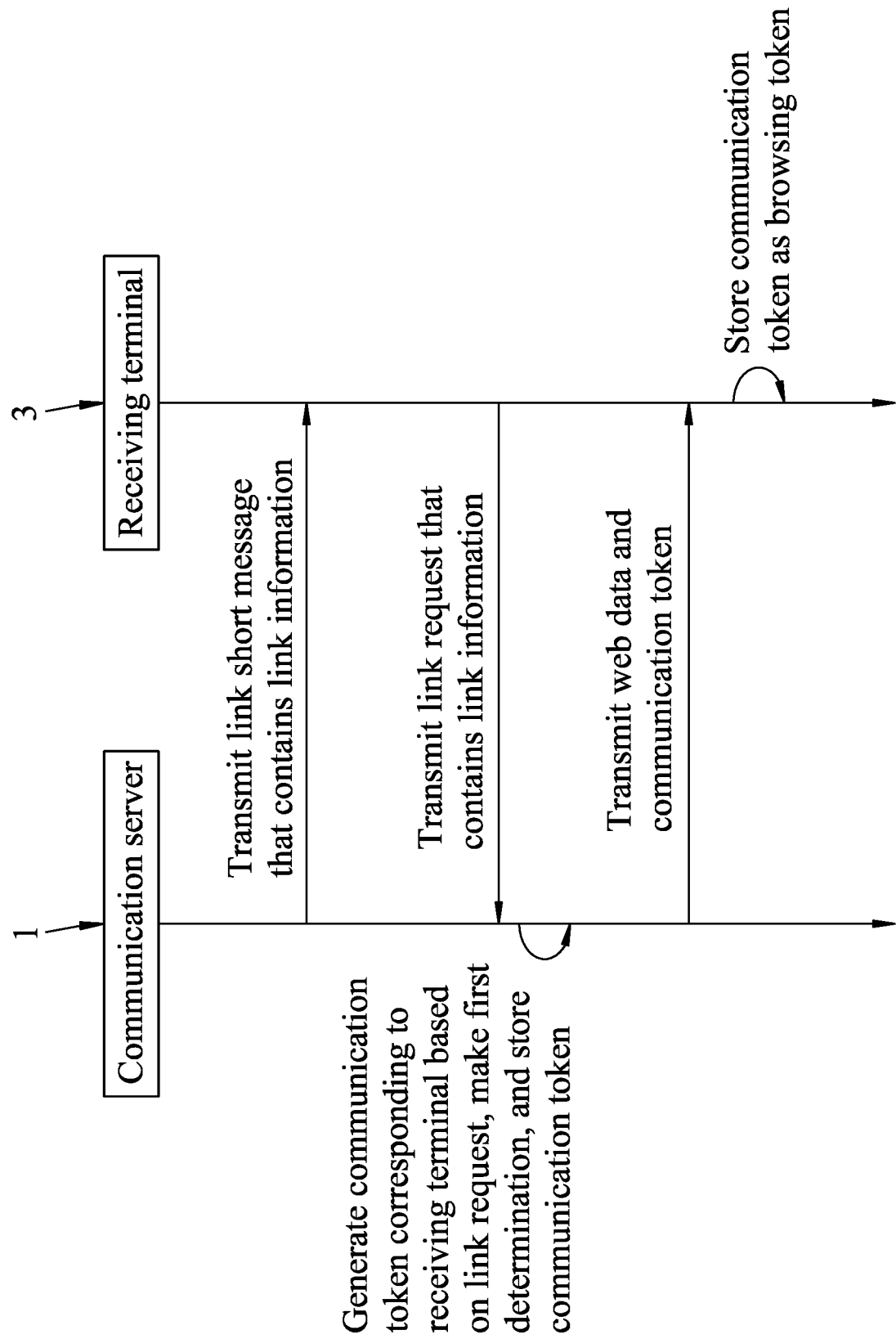
FIGS. 4 and 5 illustrate an exemplary data flow between a communication server and a receiving terminal of the system.
Figure 5:
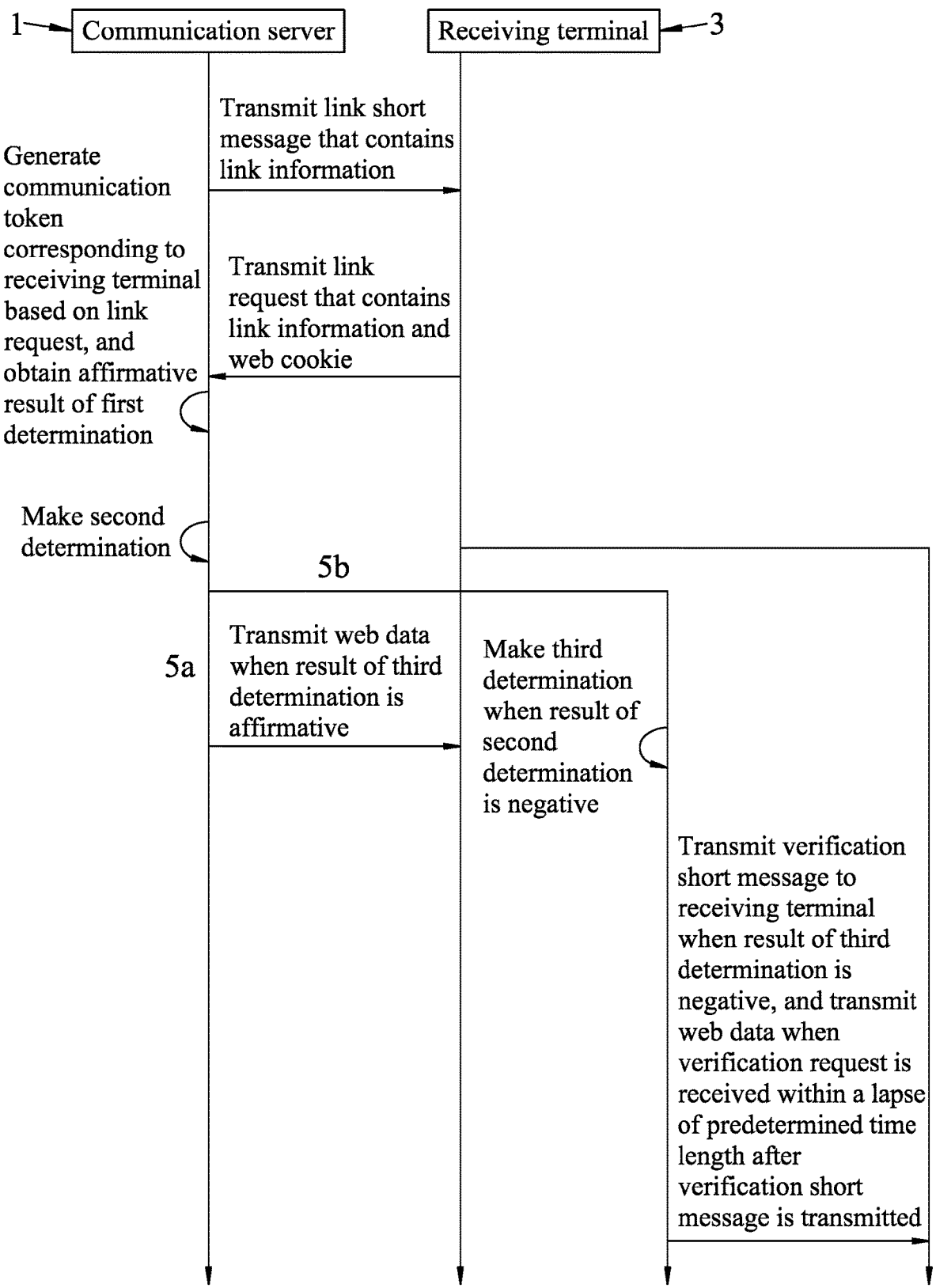

Referring to FIGS. 4 and 5, data flow between the communication server 1 and the receiving terminal 3 is illustrated to clarify procedures of the method according to the disclosure.

Referring to FIG. 4, the communication server 1 for the first time transmits the link short message 4, which contains the link information, to the receiving terminal 3 based on the phone number of the receiving terminal 3. In addition, the communication server 1 stores the link information and the phone number of the receiving terminal 3. Based on the link information, the receiving terminal 3 executes the web browser to transmit the link request that contains the link information to the communication server 1. It is worth noting that since it is the first time the communication server 1 transmits the link short message 4 to the receiving terminal 3, the web browser of the receiving terminal 3 does not have stored therein the web cookie that is related to the link information, and therefore the link request does not contain the web cookie.

In response to receipt of the link request, the communication server 1 generates the communication token that uniquely corresponds to the receiving terminal 3 based on the link request, and makes the first determination as to whether the communication server has stored another communication token that is identical to the communication token thus generated. Because the result of the first determination is negative, i.e., the communication server 1 has not yet stored the communication token, the communication server 1 stores the communication token thus generated. Following that, the communication server 1 transmits the web data and the communication token to the receiving terminal 3. After receiving the communication token from the communication server 1, the receiving terminal 3 stores the communication token as the browsing token, and executes the web browser to open, based on the web data, the webpage that is associated with the IM interface 11 so as to conduct communication with the transmitting terminal 2.

Referring to FIG. 5, the communication server 1 for the second time transmits the link short message 4, which contains the link information, to the receiving terminal 3 based on the phone number of the receiving terminal 3. Based on the link information, the receiving terminal 3 executes the web browser to transmit the link request that contains the link information and the web cookie to the communication server 1. It is worth noting that since it is the second time the communication server 1 transmits the link short message 4 to the receiving terminal 3 and since the web browser of the receiving terminal 3 has previously been executed to open the web page, the web browser has already stored the web cookie that is related to the link information, and therefore the link request contains both the link information and the web cookie.

In response to receipt of the link request, the communication server 1 generates the communication token that uniquely corresponds to the receiving terminal 3 based on the link request. Because it is not the first time the communication server 1 receives the link request from the receiving terminal 3 and because the communication server 1 has stored the communication token the first time the communication server 1 receives the link request from the receiving terminal 3, the result of the first determination made by the communication server 1 is affirmative. Following that, the communication server 1 makes the second determination as to whether the browsing token contained in the web cookie that is contained in the link request is identical to the communication token thus generated.

When the result of the second determination is affirmative, i.e., the receiving terminal 3 is authenticated in identity verification, a flow of procedure proceeds to a path (5*a*) where the communication server 1 adjusts the correctness parameter by increasing the value of the correctness parameter or by setting the value of the correctness parameter to the preset correctness value, and transmits the web data to the receiving terminal 3 so as to enable the receiving terminal 3 executing the web browser to open the webpage that is associated with the IM interface 11. Subsequently, the receiving terminal 3 and the transmitting terminal 2 are communicable with each other via the IM interface 11.

Otherwise, when the result of the second determination is negative, i.e., the receiving terminal 3 is not authenticated in identity verification, the flow of procedure proceeds to a path (5*b*) where the communication server 1 decreases the value of the correctness parameter, and makes the third determination as to whether the value of the correctness parameter is not smaller than the predetermined threshold value. When the result of the third determination is affirmative, it means that even though the receiving terminal 3 is not authenticated in identity verification since the result of the second determination is negative, the correctness parameter of the receiving device 3 still has a relatively high value due to previous successful records in identity verification, and thus the receiving terminal 3 is still trusted by the communication server 1. The communication server 1 then transmits the web data to the receiving terminal 3. Oppositely, when the result of the third determination is negative, i.e., the value of the correctness parameter is smaller than the predetermined threshold value and the receiving terminal 3 is not trusted by the communication server 1, the communication server 1 transmits the verification short message to the receiving terminal 3 based on the phone number of the receiving terminal 3 for further verification. Later, the communication server 1 transmits the web data to the receiving terminal 3 in response to receipt of the verification request within a lapse of the predetermined time length after the verification short message is transmitted (i.e., the receiving terminal 3 is authenticated in identity verification). After receiving the web data, the receiving terminal 3 executes the web browser to open the web page that is associated with the IM interface 11 to communicate with the transmitting terminal 2.

In summary, the method of initiating opening of a webpage with identity verification and through messaging service according to the disclosure utilizes the communication server 1 to carry out identity verification associated with the receiving terminal 3 based on determinations as to whether the browsing token transmitted by the receiving server 3 is identical to the communication token that has been stored in the communication server 1, and whether the verification request is received by the communication server 1 within the predetermined time length since the verification short message was transmitted to the receiving terminal 3. Web browsers corresponding to non-targeted consumers who receive the link short message 4 forwarded by others do not have stored therein the web cookie which contains the browsing token for passing the identity verification to open the IM interface 11. In this way, access to the web data can be controlled by the merchant and privacy of consumers may be ensured no matter how the short message is forwarded. Moreover, since the verification short message is sent to the receiving terminal 3 possessed by the consumer presumed to have access to the IM interface 11, the consumer may be alerted when in receipt of the verification short message and may take appropriate actions to notify the merchant, so risk of identity theft may be reduced and rights (e.g., privacy rights) of consumers and/or merchants may be protected.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method of initiating opening of a webpage with identity verification and through messaging service, the method adapted to be implemented by a communication server that is communicable with a receiving terminal, the method comprising:

transmitting a link short message that contains link information to the receiving terminal based on a phone number of the receiving terminal, and storing the link information and the phone number of the receiving terminal that corresponds to the link information, transmission of the link short message enabling the receiving terminal to transmit a link request to the communication server by using a web browser based on the link information, where the link request contains the link information, and the link request further contains a web cookie when the web browser has stored the web cookie that is related to the link information and that contains a browsing token;

generating a communication token that corresponds to the receiving terminal based on the link request, and making a first determination as to whether the communication server has stored another communication token that is identical to the communication token thus generated;

when a result of the first determination is negative, storing the communication token thus generated, and transmitting web data and the communication token thus generated to the receiving terminal, where the web data is usable by the web browser to open a webpage and the receiving terminal stores the communication token received from the communication server as the browsing token;

when the result of the first determination is affirmative, making a second determination as to whether the browsing token contained in the web cookie that is contained in the link request is identical to the communication token thus generated;

when a result of the second determination is affirmative, transmitting the web data to the receiving terminal; and when the result of the second determination thus made is negative, transmitting a verification short message that contains a verification link to the receiving terminal based on the phone number of the receiving terminal, and transmitting the web data to the receiving terminal in response to receipt of a verification request within a lapse of a predetermined time length after the verification short message is transmitted, where the verification request is transmitted by the receiving terminal via the verification link.

2. The method as claimed in claim 1, further comprising:

when the result of the second determination thus made is negative, making a third determination as to whether a value of a correctness parameter is not smaller than a predetermined threshold value;

when a result of the third determination thus made is affirmative, transmitting the web data to the receiving terminal; and when the result of the third determination thus made is negative, transmitting the verification short message to the receiving terminal, and transmitting the web data to the receiving terminal in response to receipt of the verification request within the lapse of the predetermined time length after the verification request is transmitted.

3. The method as claimed in claim 2, further comprising:

when the result of the second determination thus made is affirmative, increasing the value of the correctness parameter, or setting the value of the correctness parameter be greater than the predetermined threshold value; and when the result of the second determination thus made is negative, decreasing the value of the correctness parameter.

4. The method as claimed in claim 1, the receiving terminal being communicable with a transmitting terminal via the communication server, wherein the web data transmitted by the communication server is associated with an interface of instant messaging (IM) which enables real-time communication to be conducted between the transmitting terminal and the receiving terminal.

5. The method as claimed in claim 1, further comprising:

determining whether a length of the link short message is greater than a predetermined message length;

transmitting the link short message to the receiving terminal based on multimedia messaging service (MMS) standard when it is determined that the length of the link short message is greater than the predetermined message length; and transmitting the link short message to the receiving terminal based on short message service (SMS) standard when it is determined that the length of the link short message is not greater than the predetermined message length.

6. The method as claimed in claim 5, wherein the length of the link short message is a total number of word(s) of the link short message.

7. The method as claimed in claim 1, wherein the link information contains webpage address information, and code information that is randomly generated.

8. The method as claimed in claim 1, wherein, in addition to the verification link, the verification short message further contains main text related to identity verification.

9. The method as claimed in claim 8, wherein the verification link contains webpage address information, and code information that is randomly generated.

10. The method as claimed in claim 1, wherein each of the link information and the verification link is a uniform resource locator (URL).

* * * * *